US010401213B2

(12) United States Patent
Morgner

(10) Patent No.: US 10,401,213 B2
(45) Date of Patent: Sep. 3, 2019

(54) PAN SCALE FOR WEIGHING AND EJECTING FIBER COMPONENTS ONTO A MIXING BELT

(71) Applicant: TEMAFA Maschinenfabrik GmbH, Bergisch Gladbach (DE)

(72) Inventor: Joerg Morgner, Kuerten (DE)

(73) Assignee: TEMAFA Maschinenfabrik GmbH, Bergisch Gladbach (DE)

( * ) Notice: Subject to any disclaimer, the term of this patent is extended or adjusted under 35 U.S.C. 154(b) by 161 days.

(21) Appl. No.: 15/696,862

(22) Filed: Sep. 6, 2017

(65) Prior Publication Data
US 2018/0066979 A1 Mar. 8, 2018

(30) Foreign Application Priority Data
Sep. 7, 2016 (DE) .................... 10 2016 116 784

(51) Int. Cl.
*G01G 21/22* (2006.01)
*G01G 13/18* (2006.01)
*D01G 13/00* (2006.01)

(52) U.S. Cl.
CPC ............ *G01G 21/22* (2013.01); *D01G 13/00* (2013.01); *G01G 13/18* (2013.01)

(58) Field of Classification Search
CPC ........ G01G 13/18; G01G 13/22; G01G 21/22; D01G 13/00
See application file for complete search history.

(56) References Cited

U.S. PATENT DOCUMENTS

| | | | | |
|---|---|---|---|---|
| 3,295,728 A | * | 1/1967 | Hochmuth | ............. B65G 65/24 222/166 |
| 4,848,534 A | * | 7/1989 | Sandwall | ............. B65D 90/582 198/535 |
| 5,191,947 A | * | 3/1993 | Petersen | ................ G01G 13/22 177/108 |
| 7,455,445 B2 | | 11/2008 | Rübenach | |

FOREIGN PATENT DOCUMENTS

| | | |
|---|---|---|
| DE | 42 12 997 A1 | 10/1993 |
| DE | 93 03 096 U1 | 3/1994 |
| DE | 20 2014 010 744 U1 | 6/2016 |
| GB | 2 266 598 A | 11/1993 |

OTHER PUBLICATIONS

Machine translation of DE4212997 from the EPO website, downloaded Mar. 27, 2019.*
Machine translation of DE202014010744 from the EPO website, downloaded Mar. 27, 2019.*

* cited by examiner

*Primary Examiner* — Randy W Gibson
(74) *Attorney, Agent, or Firm* — Dority & Manning, P.A.

(57) ABSTRACT

A pan scale for weighing and ejecting fiber components onto a mixing belt includes an upwardly open container having a plurality of side walls and a bottom formed by a single piece comprising a rotatably hinged bottom flap rotatable from a closing position abutting on one of the side walls into an open position folded away from such side wall, or two pieces comprising rotatably hinged bottom flaps that are rotatable away from one another from an inner closing position abutting against one another into an outer open position. The single bottom flap or at least one of the two bottom flaps includes a retaining device on a bottom surface thereof. Upon opening of the respective bottom flap, a part of the fiber components are retained in the container by the (Continued)

retaining device up to a partial opening angle (β) of the bottom flap.

22 Claims, 4 Drawing Sheets

PAN SCALE FOR WEIGHING AND EJECTING FIBER COMPONENTS ONTO A MIXING BELT

FIELD OF THE INVENTION

The present invention relates to a pan scale for weighing and ejecting fiber components onto a mixing belt with an upwardly open container comprising a multiple number of side walls and a bottom, whereas the bottom is formed by a single rotatably hinged bottom flap that can be rotated from a closing position abutting on one of the side walls into an open position folded away from such side wall. Alternatively, the bottom is formed by two rotatably hinged bottom flaps, which can be rotated away from one another from an inner closing position abutting against one another into an outer open position.

Furthermore, the present invention relates to a pan scale for weighing and ejecting fiber components onto a mixing belt with an upwardly open container, which comprises a multiple number of side walls and a bottom, whereas the bottom is formed by a single rotatably hinged bottom flap that can be rotated from a closing position abutting on one of the side walls into an open position folded away from such side wall. Alternatively, the bottom is divided into two parts in the longitudinal direction and is formed by two rotatably hinged bottom flaps that can be rotated away from one another from an inner closing position abutting against one another into an outer open position, with a control mechanism for closing and opening the single bottom flap or the two bottom flaps of the two-piece bottom, and with an electronic control unit for controlling the control mechanism.

Furthermore, the present invention relates to a mixing device for fiber components with a mixing belt and at least one pan scale arranged above the mixing belt.

BACKGROUND

Mixing devices are used to produce precise and intensive mixtures, for example, for the spinning industry and the non-woven industry. The mixed materials are various chemical fibers, cotton and chemical fibers, various recovered waste fibers, cotton and recovered waste fibers. With high-production weighing cart feeders, in practice, a material cone is produced by means of the pan scale, which is usually arranged centrally above the mixing belt, and leads to a high accumulation of fibers in a short period of time in a multiple number of successively arranged machines. In a disadvantageous manner, defective weighing may arise as a result of weighing containers that are not completely emptied, and material densities that are too high in the center, with disruptions in material transport and in the opening on the downstream mixing roll.

U.S. Pat. No. 7,455,445 B2 discloses a device for mixing fiber components, such as fiber tufts, in particular in spinning preparation, the production of non-wovens or the like, by which the fiber material to be dosed is conveyed in at least two weighing containers, and the fiber material is ejected onto a mixing belt after weighing from the at least two weighing containers. The weighing containers are arranged one behind the other above the mixing belt, viewed in the direction of belt travel. In order to avoid material cones that cause disruptions, the position of at least one weighing container can be adjusted in a location-changing manner transversely to the longitudinal extent of the mixing belt. The disadvantage of this is the high degree of design complexity of the device, which makes it highly error-prone and expensive to manufacture.

SUMMARY OF THE INVENTION

Thus, a task of the present invention is to provide a mixing device that is more cost-effective in the production process, by means of which a homogeneous distribution of the fiber components in the transverse direction of the mixing belt can be achieved.

The tasks are solved by a pan scale and a mixing device having the characteristics described and claimed herein.

A pan scale for weighing and ejecting fiber components onto a mixing belt is proposed. Pan scales of this kind are provided, in particular, for weighing cart feeders in the spinning industry and the non-woven industry. The pan scale comprises an upwardly open container. The container features a multiple number of side walls and a bottom divided into two parts in the longitudinal direction of the container. The bottom is formed by a single rotatably hinged bottom flap, which can be rotated from a closing position abutting on one of the side walls into an open position folded away from such side wall. Alternatively, the bottom is divided into two parts in the longitudinal direction of the container and is formed by two bottom flaps, which are rotatably hinged, in particular on the side walls. The two bottom flaps can be rotated away from one another from an inner closing position abutting against one another into an outer open position. In the closed position, the container is closed downwards, such that fiber components can be filled and subsequently weighed through its upper opening. In the open position, the container is opened downwards, such that the filled and weighed fiber components can be ejected onto the mixing belt.

The single bottom flap or at least one of the two bottom flaps of the two-piece bottom features a retaining device at least in one area on its bottom surface (i.e., in the area of the bottom surface). The retaining device is formed and/or arranged in such a manner that, upon the opening of the associated bottom flap, a part of the fiber components can be retained by means of a form closure and/or frictional closure up to a partial opening angle.

By means of the retaining device, the quantity and the location of the distributable fiber components can be influenced as a function of the opening angle. Thus, a partial quantity of the fiber components is retained by the retaining device up to a partial opening angle in the interior of the container. Only when the specified partial opening angle is exceeded during the further rotation can the retained fiber components overcome the retaining device and be unloaded onto the mixing belt. This also occurs due to the rotation of the at least one bottom flap at a position displaced relative to the first unloading location in the transverse direction of the mixing belt.

Thus, by means of the retaining device, a more homogeneous distribution of the fiber components in the transverse direction of the mixing belt can be advantageously achieved. This ensures a complete emptying of the pan scale, since material cones are avoided. Also, disruptions in material transport are avoided. Furthermore, this makes it possible to provide a highly cost-effective pan scale, by means of which excellent distribution can be achieved.

It is advantageous if the retaining device is spaced at a distance from the pouring edge. This ensures that the fiber components located between the pouring edge and the retaining device are immediately ejected, and the fiber components arranged behind the retaining device or in the area of the retaining device are retained by it up to a certain opening angle. As a result, different amounts of the fiber components can be ejected in different areas of the mixing belt.

It is advantageous if the retaining device is a retaining structure. The retaining structure may be, for example, a fluting, a granulation and/or a corrugation, i.e. a wave-shaped structure. The retaining structure is formed in such a manner that it preferably features a higher roughness and/or a higher coefficient of friction compared to an area of the bottom surface free of retaining devices.

Alternatively or in addition, it is advantageous if the retaining device is at least one retaining element. The retaining element may be, for example, an elevation and/or a recess. A multiple number of retaining elements arranged one behind the other can form a retaining structure. The retaining elements preferably extend parallel to the longitudinal center plane and/or across the entire length of the associated bottom flap; that is, in particular, the single bottom flap or one of the two bottom flaps of the two-piece bottom. Preferably, at least two retaining elements feature a size that is different from one another.

It is advantageous if the retaining structure and/or the retaining element is formed in one piece with the bottom flap. The bottom flap may, for example, be pressed in such a manner that it features a wave shape. Alternatively, the retaining structure and/or the retaining element may be incorporated into the bottom surface of the bottom flap, which would be the case, in particular, with a retaining structure formed as a fluting. Alternatively, however, it is also advantageous if the retaining structure and/or the retaining element is connected (in particular, glued, screwed, welded and/or pressed) to the bottom flap. In order to be able to influence the time of ejection and/or the quantity of ejection of the fiber components, it is advantageous if the retaining structure and/or the retaining element features a particularly planar, concave and/or convex retaining surface, which is preferably arranged perpendicular to the bottom surface or is inclined relative thereto. Furthermore, it is likewise conceivable that the retaining surface is formed as a surface of the retaining structure. The retaining surface may feature a regular and/or irregular structure.

It is advantageous if the single bottom flap or at least one of the two bottom flaps of the two-piece bottom is at least partially formed as a sheet metal bending part. In this connection, it is also advantageous if the single bottom flap or at least one of the two bottom flaps of the two-piece bottom features a constant wall thickness. In addition or alternatively, it is advantageous if the single bottom flap or at least one of the two bottom flaps of the two-piece bottom is shaped and/or assembled from several individual parts, in particular welded together, in such a manner that the bottom flap features, in one area, a shape forming the retaining element and/or the retaining structure.

It is advantageous if the retaining surface of the retaining element is provided with the retaining structure.

It is also advantageous if, in the case of the two bottom flaps of the two-piece bottom, the retaining element of one of the two bottom flaps extends into the area of the other bottom flap.

It is advantageous if at least one of the bottom flaps features a multiple number of retaining devices, in particular retaining structures and/or retaining elements, arranged one behind the other from the pouring edge outwards.

A pan scale for weighing and ejecting fiber components onto a mixing belt, which is preferably formed in accordance with the preceding description, is also proposed, whereas the stated characteristics can be present individually or in any desired combination. Pan scales of this kind are provided, in particular, for weighing cart feeders in the spinning industry and the non-woven industry. The pan scale comprises an upwardly open container. The container features a multiple number of side walls and a bottom divided into two parts in the longitudinal direction of the container. The bottom is divided into two parts in the longitudinal direction of the container and is formed by two bottom flaps that are rotatably hinged, in particular on the side walls. The two bottom flaps can be rotated away from one another from an inner closing position abutting against one another into an outer open position. In the closed position, the container is closed downwards, such that fiber components can be filled and subsequently weighed through its upper opening. In the open position, the container is opened downwards, such that the filled and weighed fiber components can be ejected onto the mixing belt. The two bottom flaps are formed asymmetrically relative to one another, in such a manner that they feature bottom surfaces of different sizes.

In particular, due to the asymmetry, the position at which the ejection of the fiber components is to start is advantageously determined in the transverse direction of the mixing belt provided for this purpose. Furthermore, as a result of the asymmetrical configuration of the bottom flaps, the volume capacities of the fiber components of the respective bottom flap may be compensated for. Thus, in practice, the container is not homogeneously filled with the fiber components. Instead, an uneven distribution of the fiber components is formed inside the container. If, for example, upon the filling of the container, an increased filling of the container takes place on one side, it is advantageous if the bottom flap with the smaller bottom surface is arranged in this area, since the filling height is higher in this area. In the area of the lower filling height, the bottom flap with the larger bottom surface is accordingly arranged. In comparison, therefore, the two bottom flaps hold volume capacities of the fiber components that are adjusted to one another. As a result, a more homogeneous distribution of the fiber components in the transverse direction of the mixing belt can be effected during unloading. As a result, the unloading location in the transverse direction of the mixing belt can be influenced at the beginning of the opening phase by the two asymmetrical bottom flaps. The volume capacities of the two bottom flaps can also be influenced.

Thus, as a result of the asymmetrical configuration of the bottom surfaces, a more homogeneous distribution of the fiber components in the transverse direction of the mixing belt can be advantageously achieved. This ensures a complete emptying of the pan scale, since material cones are avoided. Furthermore, disruptions in material transport are avoided. Furthermore, this makes it possible to provide a highly cost-effective pan scale, by means of which excellent distribution can be achieved.

It is advantageous if, relative to one another, the two bottom surfaces are of the same length in the longitudinal direction of the container and/or of different widths in the transverse direction of the container. Thereby, the volume capacities of the respective bottom flap can be advantageously influenced.

It is also advantageous if, in the area of a separating plane, the two bottom flaps abut one another at least in one section in the closed position. This ensures that the two bottom flaps securely lock in their contact area, such that the fiber components are held inside the container. In addition or alternatively, it is also advantageous if the separating plane features a translational offset relative to a longitudinal center plane of the container. As a result, a correspondingly asymmetrical configuration of the two bottom flaps can be achieved, such that they feature volume capacities that differ from one another. This can counteract any inhomogenous filling of the pan scale, which in turn has a positive effect on a homogeneous distribution of the fiber components in the transverse direction of the mixing belt.

It is advantageous if the bottom surface, in particular a first partial area, is inclined to at least one of the two bottom flaps in such a manner that, in the cross-sectional view of the container, it slopes or rises outwardly starting from the pouring edge in the closed position. As a result, the ejection angle can be influenced by the fiber components emerging from the ejection opening in the opening phase of the pan scale.

Furthermore, it is advantageous if the bottom surface of at least one of the two bottom flaps features a second partial area adjoining the first partial area. Preferably, such second partial area is inclined opposite to the first partial area, such that a bend is formed between these two. The bottom surface is preferably formed to be planar, concave and/or convex.

It is advantageous if at least one of the two bottom flaps features a side surface adjoining the respective bottom surface. The side surface is preferably inclined in such a manner that, when the bottom flap is closed, the container tapers in the direction of the bottom, preferably in a funnel shape.

It is advantageous if the bottom flaps are mounted in an articulated manner on two opposing side surfaces, in particular front side surfaces, in a respective linking point. In this connection, it is also advantageous if the linking points of the two bottom flaps are arranged symmetrically with respect to the longitudinal center plane. In addition or alternatively, it is advantageous if the two bottom flaps can be pivoted by the same maximum opening angle.

It is also advantageous if the two bottom flaps feature, in their open position, a maximum opening width formed between their respective pouring edge and the separating plane. In order to be able to influence the ejection quantity of fiber components for each bottom flap in such a manner that the distribution of fiber components is formed as homogeneously as possible in the transverse direction of the mixing belt, it is advantageous if the two bottom flaps feature opening widths that vary in size relative to one another.

A pan scale for weighing and ejecting fiber components onto a mixing belt, which is preferably formed in accordance with the preceding description, is also proposed, whereas the stated characteristics can be present individually or in any desired combination. The pan scale comprises an upwardly open container, which comprises a multiple number of side walls and a bottom, whereas the bottom is formed by a single rotatably hinged bottom flap, which can be rotated from a closing position abutting on one of the side walls into an open position folded away from such side wall, or whereas the bottom is divided into two parts in the longitudinal direction and is formed by two rotatably hinged bottom flaps, which can be rotated away from one another from an inner closing position abutting against one another into an outer open position. The pan scale includes a control mechanism for closing and opening the single bottom flap or the two bottom flaps of the two-piece bottom. Further, the pan scale features an electronic control unit for controlling the control mechanism. The control mechanism is formed and/ or the control unit is programmed in such a manner that a rotational speed and/or a rotational acceleration of the single bottom flap or at least one of the two bottom flaps of the two-piece bottom can be controlled as a function of the opening angle. In addition or alternatively, the control mechanism is formed and/or programmed in such a manner that the opening angle of the single bottom flap or at least one of the two bottom flaps of the two-piece bottom can be controlled as a function of time. Advantageously, the quantity of ejection of the fiber components in the cross-section of the mixing belt can thereby be influenced in a partial area of the mixing belt. Thus, a more homogeneous distribution of the fiber components in the transverse direction of the mixing belt can be advantageously achieved. This ensures a complete emptying of the pan scale, since material cones are avoided. Furthermore, disruptions in material transport are avoided. Furthermore, this makes it possible to provide a highly cost-effective pan scale, by means of which excellent distribution can be achieved.

It is advantageous if the control unit is programmed in such a manner that the rotational speed and/or the rotational acceleration upon the opening of the bottom flap is held constant, increased and/or reduced at least at an angular interval. It is also advantageous if the rotational speed and/or the rotational acceleration upon the opening of the bottom flap is, at a first angular interval, smaller than or greater than at a second angular interval.

It is advantageous if the control mechanism and/or the control unit are formed in such a manner that the opening angle can be adjusted and/or controlled steplessly or in discrete steps.

Furthermore, it is advantageous if the control unit is programmed in such a manner that the bottom flap is opened up to a first angular position and is held in this first angular position within a first time window, and/or is subsequently opened up to a second angular position and/or is held in this second angular position within a second time window.

It is also advantageous if the control mechanism comprises at least one actuator, in particular a discretely or steplessly adjustable actuator, and/or if each of the two bottom flaps features a common actuator or a separately controllable actuator.

In an advantageous additional form of the invention, the pan scale comprises a control mechanism, in particular a mechanical, pneumatic and/or hydraulic control mechanism, which is formed in such a manner that the rotational speed at least of one bottom flap can be controlled as a function of the opening angle. In addition or alternatively, it is advantageous if the pan scale comprises an electronic control unit that is programmed in such a manner that the rotational speed at least of one bottom flap can be controlled as a function of the opening angle. Advantageously, the quantity of ejection of the fiber components can thereby be influenced in a partial area of the mixing belt. Accordingly, in a partial area of the mixing belt, more fiber components are ejected, the slower the rotational speed is selected in this phase. However, if it is desired that less fiber components are to be ejected in a partial area of the mixing belt, a faster rotational speed is preferably to be selected.

It is advantageous if the rotational speed upon the opening of the bottom flap is, at a first angular interval, smaller or greater than at a second angle interval.

It is advantageous if the pan scale features a weighing unit, by means of which the fiber components filled into the container can be weighed.

It is also advantageous if the two bottom flaps feature a common actuator, by means of which the two bottom flaps can be actuated simultaneously. Alternatively, however, it is also advantageous if each of the bottom flaps features a separately controllable actuator. As a result, the two bottom flaps can be controlled independently of one another, such that the quantity of fiber components to be ejected can be influenced for each bottom flap.

A mixing device for fiber components with a mixing belt and at least one pan scale arranged above the mixing belt is also proposed. The pan scale is formed in accordance with preceding description, whereas the specified components can be present individually or in any desired combination. As a result, a more homogeneous distribution of the fiber components can be advantageously achieved in the transverse direction of the mixing belt.

It is advantageous if the mixing device comprises at least two pan scales arranged one behind the other and/or fixed in location in the longitudinal direction of the mixing belt.

It is also advantageous if the at least two scales arranged one behind the other are twisted relative to one another by 180° around a vertical axis of the mixing belt. Thus, in the case of an asymmetrical configuration of the bottom flaps, the separating plane of the first pan scale can be arranged in a manner offset to the left in comparison to the center axis of the mixing belt, and the second mixing scale, which is identical but twisted by 180°, can be arranged in a manner offset to the right. In addition or alternatively, it is also advantageous if the two pan scales are arranged in a manner offset to a transverse axis of the mixing belt. As a result, the ejection areas in which the ejection of the fiber components begins can be selected with the respective pan scales in areas offset relative to one another in the transverse direction of the mixing belt. Advantageously, this results in a more homogeneous distribution of the fiber components in the transverse direction of the mixing belt.

BRIEF DESCRIPTION OF THE DRAWINGS

Additional advantages of the invention are described in the following embodiments. The following is shown.

DETAILED DESCRIPTION

Figure 1:
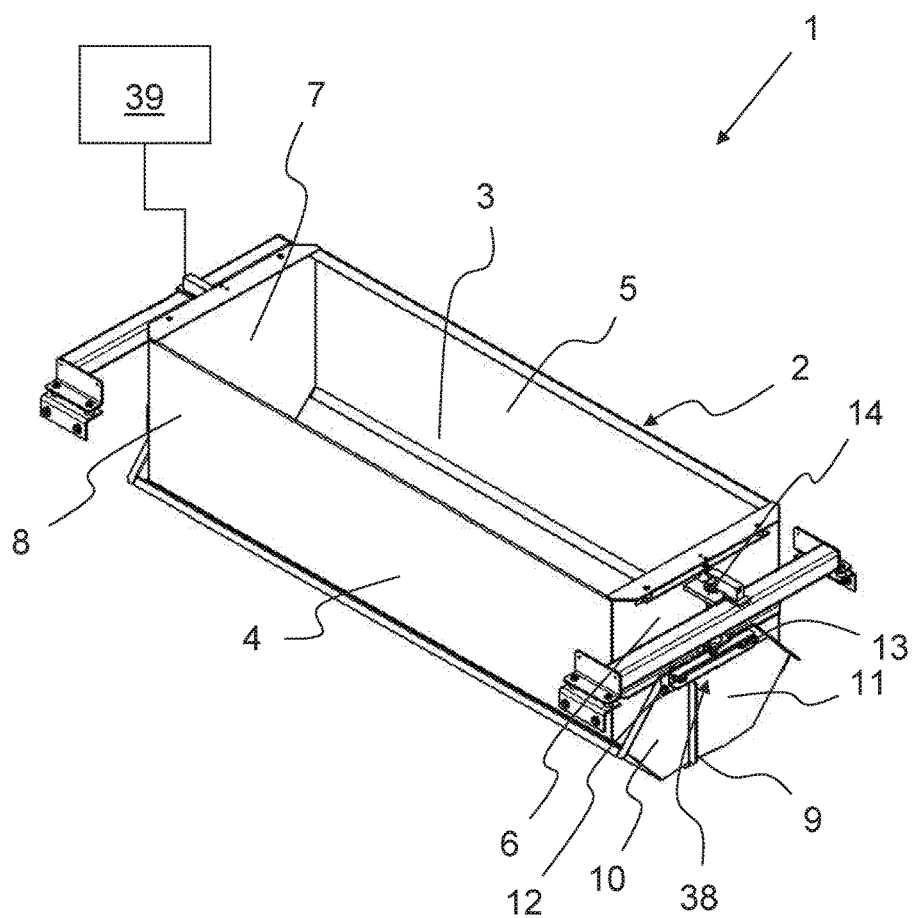
FIG. 1 is a perspective view of a pan scale with bottom flaps formed asymmetrically relative to one another.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a pan scale 1 for weighing and ejecting fiber components onto a mixing belt (not shown). The pan scale includes an upwardly open container 2. Through an upper opening 3, such container 2 can be filled with fiber components, for example a textile fiber mixture of fiber tufts, from a weighing cart feeder (likewise not shown). The container 2 includes several side walls 4, 5, 6, 7, which form a closed container frame 8. In accordance with the present embodiment, the container frame 8 is formed in a rectangular manner, whereas it features two opposing side walls 4, 5 on the longitudinal side and two opposing front-side side walls 6, 7. The side walls 4, 5 on the longitudinal side are longer than the two front-side side walls 6, 7. Furthermore, the container 2 comprises a bottom 9. That closes the container frame 8 downwards.

The bottom 9 is formed by two bottom flaps 10, 11. The two bottom flaps 10, 11 are rotatably mounted on the container frame 8, in particular in accordance with the present embodiment, on the two front-end side walls 6, 7, in a respective linking point 12, 13. Through a control mechanism 38 of the pan scale 1, which in the present case preferably comprises at least one actuator 14, the two bottom flaps 10, 11 can be rotated from their closed position, shown in FIGS. 1 and 2a, into the open position shown in FIG. 2b. The two bottom flaps 10, 11 are rotated outwardly away from one another. The rotary movement of the two bottom flaps 10, 11 is controlled by means of a control unit 39.

Figure 2A:
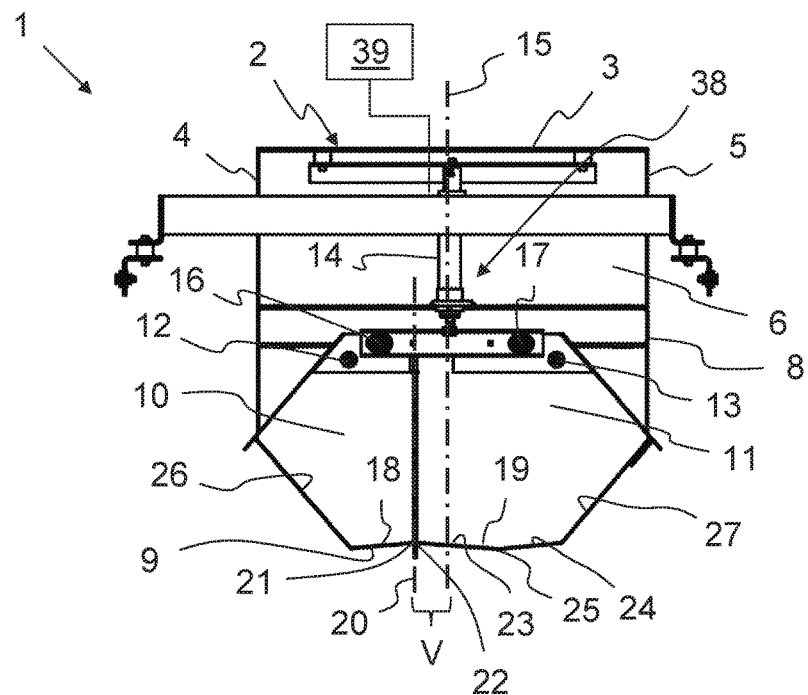
FIG. 2a is a front-end side view of the pan scale in a closed position.
Figure 2B:
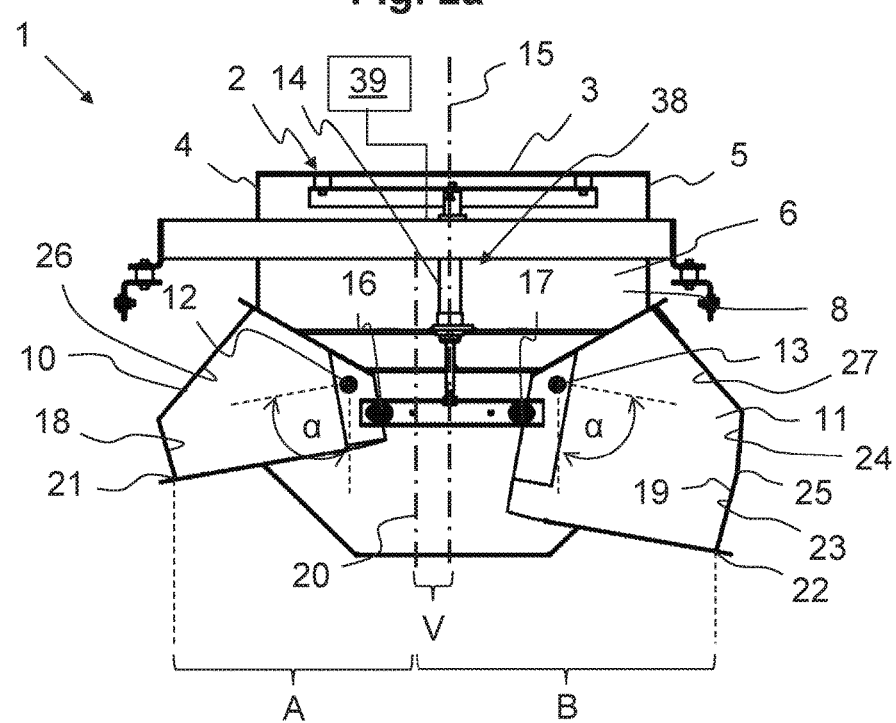
FIG. 2b is a front-end side view of the pan scale in an open position.

As can be seen in particular from FIGS. 2a and 2b, the two linking points 12, 13 of the two bottom flaps 10, 11 are arranged symmetrically relative to a longitudinal center plane 15 of the pan scale 1. The same applies to a first and second force application point 16, 17 of the actuator 14 on the respective bottom flap 10, 11. In accordance with the present embodiment, the actuator 14 is not connected directly to the respective bottom flap 10, 11, but indirectly through a mechanism, which is not further explained in detail. Based on the mutually symmetrical force application points 16, 17 along with the linking points 12, 13, the two bottom flaps are each rotatable by a same maximum opening angle α.

As can be seen in particular from FIGS. 1, 2a and 2b, the two bottom flaps 10, 11 are formed in a manner asymmetrical to one another. As a result, such bottom surfaces 18, 19 feature surface areas of different sizes relative to one another. Thus, as can be seen in particular from FIG. 2a, one of the two bottom flaps 10 is narrower and the other bottom flap 11 is wider. In the closed position shown in FIG. 2a, the two bottom flaps 10, 11 together feature a basic shape that is essentially symmetrical to the longitudinal center plane 15 of the container 2. However, the two bottom flaps 10, 11 are of different sizes, such that they are formed in a manner asymmetrical to one another. For this purpose, a separating plane 20 of the two bottom flaps 10, 11 does not extend into the longitudinal center plane 15. Instead, the separating plane 20 in accordance with FIG. 2a features a translational offset V relative to the longitudinal center plane 15 of the container 2.

Through the asymmetrical configuration of the two bottom flaps 10, 11 described above, the fiber component located in the container 2 can be advantageously achieved more homogeneously across the width of the mixing belt, which is not shown in the present case. Thus, there is essentially the problem that, in the case of weighing cart feeders, a material cone is produced by means of the pan scale, which is usually arranged centrally above the mixing belt. In the case of a multiple number of pan scales arranged one behind the other, this can lead to high fiber accumulations in a short period of time. In a disadvantageous manner, defective weighing may arise as a result of pan scales that are not completely emptied, and material densities that are too high in the center, with disruptions in material transport and in the opening on the downstream mixing roll. As a result, a more homogeneous distribution of width of the fiber components in the transverse direction of the mixing belt is pursued; this can be achieved, for example, in accordance with an asymmetrical form of the two bottom flaps 10, 11. Accordingly, in practice, the pan scale 1 is not homogeneously filled. Instead, maximum levels of filling occur in a manner offset in the transverse direction of the pan scale 1 relative to the longitudinal center plane 15. Through a corresponding asymmetrical configuration of the bottom flaps 10, 11, such asymmetrical filling can be compensated for, and a more homogeneous distribution of width can be achieved upon emptying onto the mixing belt.

As can be seen in particular from FIGS. 1 and 2a, the two bottom surfaces 18, 19 of the two bottom flaps 10, 11 are of the same length relative to one another in the longitudinal direction of the container. However, due to the asymmetrical configuration, they are of different widths in the transverse direction of the container in accordance with FIG. 2a.

In accordance with the present embodiment, the first bottom surface 18 of the first bottom flap 10 is inclined relative to the horizontal line. In the cross-sectional view of the container 2 illustrated in FIG. 2a, the first bottom surface 18 thus drops off outwardly from a pouring edge 21 of the bottom flap; that is, in the direction of the first left-side side wall 4. The same applies to the second bottom flap 11. However, the second bottom surface 19 of the second bottom flap 11 features a first and second partial area 23, 24. The first partial area 23 is formed analogously to the first bottom surface 18 of the first bottom flap 10. Accordingly, the first partial area 23 drops off outwardly from the second pouring edge 22. However, the second partial area 24 is inclined in an opposite direction compared to the first partial area 23. As a result, a bend 25 is formed between the first and second partial areas 23, 24. However, the second bottom surface 19 features an essentially concave shape.

In accordance with FIGS. 1 and 2a, each of the two bottom flaps 10, 11 also features a side surface 26, 27 in addition to its bottom surface 18, 19. The two side surfaces 26, 27 adjoin the respective outside surface 18, 19 outwardly. In accordance with the present embodiment, the two side surfaces 26, 27 are inclined relative to one another compared to a vertical line, such that, in the side view shown in FIG. 2a, they converge in essentially a funnel shape in the direction of the two bottom surfaces 18, 19. The bottom surfaces 18, 19, in particular the partial areas 23, 24 thereof, and/or the side surfaces 26, 27 can be formed as a planar surface, as shown. However, it is likewise conceivable that they feature a convex or concave shape in cross-section. Furthermore, an edge may be formed in the transition between the respective side surfaces 26, 27 in the respective bottom surfaces 18, 19. Alternatively, however, the transition may also be formed by a rounding.

As already stated above, FIG. 2b shows the pan scale 1 in the open position. In this, each of the two bottom flaps 10, 11 is rotated away from one another by its maximum opening angle α. In this open position, each of the two bottom flaps 10, 11 features a maximum opening width A, B formed between its respective pouring edge 21, 22 and the separating plane 20. Due to the asymmetrical configuration of the two bottom flaps 10, 11, the maximum opening widths A, B are of different sizes. In accordance with the present embodiment, the maximum opening width A of the first bottom flap 10 is smaller than the maximum opening width B of the second bottom flap 11.

Alternatively, in an embodiment that is not shown here, the two bottom flaps 10, 11 presented in FIGS. 1, 2a and 2b could also be formed in a manner symmetrical to one another. Furthermore, it is likewise conceivable for the bottom 9 to be formed by a single rotatably hinged bottom flap, which can be rotated from a closing position abutting on one of the side walls into an open position folded away from such side wall.

Figure 3C:
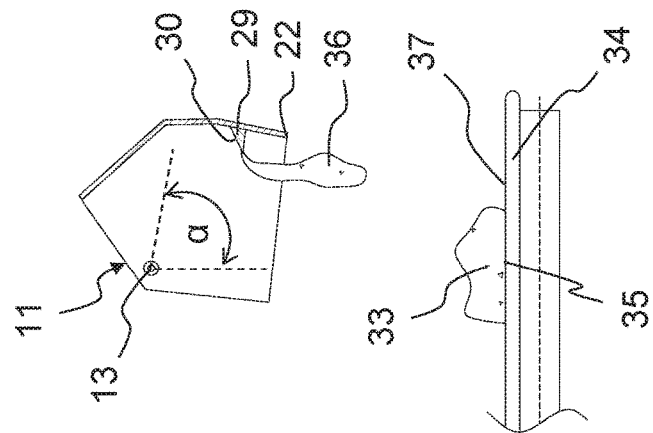
FIG. 3a-3c are schematic sectional views of a bottom flap with a retaining device in a closed position, an intermediate position, and an open position.
Figure 3B:
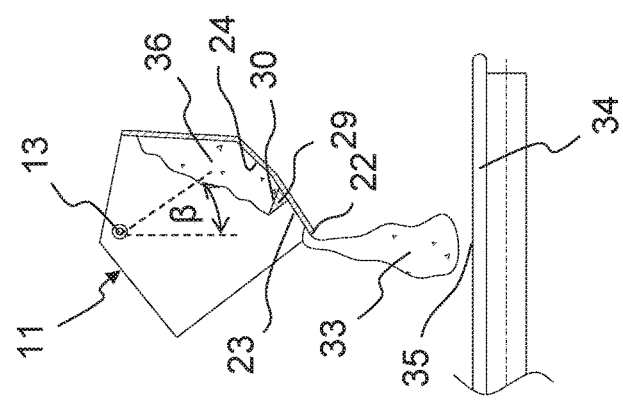
Figure 3A:
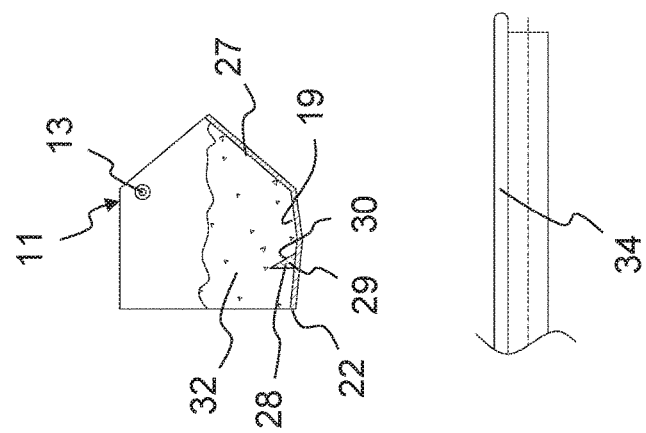

FIGS. 3a, 3b, 3c show an embodiment of a bottom flap 11 in different rotational positions. The bottom flap 11 may be a single rotatably hinged bottom flap 11, which can be rotated from a closing position abutting on one of the side walls 4 into an open position folded away from such side wall 4. Alternatively, however, the bottom flap 11 can also be one of two bottom flaps of a bottom 9 divided in the longitudinal direction of the container. The two bottom flaps can be formed symmetrically or asymmetrically relative to one another. FIG. 3a shows the bottom flap 11 in the closed position. In this closed position, the illustrated bottom flap 11 works together with an additional bottom flap 10, as shown, for example, in FIG. 2a. The additional bottom flap 10 (not shown in FIG. 3a) does not necessarily have to be formed asymmetrically relative to the illustrated bottom flap 11. Alternatively, a bottom flap, which is essentially symmetrical with respect to the outer basic shape, can also interact with the bottom flap 11 shown in FIG. 3a. However, the additional bottom flap 10, which is not shown in this case, is preferably formed in accordance with the embodiment illustrated in FIGS. 1 and 2. Alternatively, however, it is also a single bottom flap 11, which works together with one of the side walls 4. The above-stated alternatives also apply to the bottom flap 11 shown in FIG. 4.

With the following description of the embodiments of the bottom flap 11 shown in FIGS. 3a, 3b, 3c and 4, the same reference signs are used for characteristics that are identical and/or at least comparable in their configuration and/or mode of action in comparison to the first embodiment shown in FIGS. 1, 2a, 2b. To the extent that they are not explained again in detail, their configuration and/or mode of action correspond to the configuration and/or mode of action of the previously described characteristics.

In accordance with FIG. 3a, the bottom flap 11 features a retaining device 28 on its bottom surface 19. The first embodiment illustrated in FIGS. 1, 2a and 2b, in particular the first and/or second bottom flap 10, 11, may also feature a retaining device 28, which is also formed in accordance with the following description.

In the embodiment illustrated in FIG. 3a, such retaining device 28 is formed as a retaining element 29. The retaining element 29 is spaced apart from the pouring edge 22. In the present case, the retaining element 29 is formed as an elevation. It preferably extends across the entire length of the associated bottom flap 11. Alternatively, the retaining element 29 may also be formed as a recess or an indent. In the present case, the retaining element 29 and the bottom surface 19 are formed in two parts. Accordingly, the retaining element 29 is preferably connected to the bottom surface 19 in a fixed or detachable manner. The retaining element 29 can be welded, screwed or glued to the bottom surface 19. Alternatively, however, it is likewise conceivable for the retaining element 29 to be formed as a single part with the bottom surface 19, or also be formed by means of a corresponding shaping of the bottom surface 19.

In accordance with FIG. 3a, the retaining element 29 features a retaining surface 30, by means of which a part of the fiber components, upon the opening of the container 2, may be retained up to a certain opening angle. The retaining surface 30 is formed in accordance with the present embodiment. Alternatively, however, it is likewise conceivable that this is formed to be concave and/or convex. Furthermore, in accordance with the present embodiment, the retaining surface 30 is inclined relative to the associated bottom surface 19, in particular in the direction of the pouring edge 22. Alternatively, the retaining element 29 may also be formed in such a manner that the retaining surface 30 is inclined away from the pouring edge 22 or is also oriented perpendicularly to the bottom surface 19.

Figure 4:
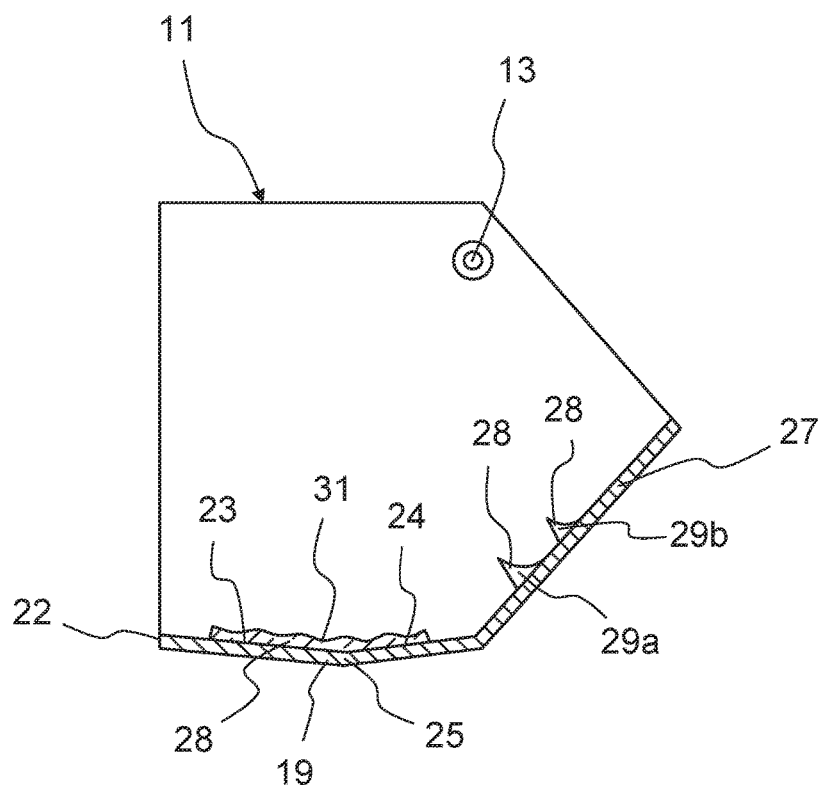
FIG. 4 is a schematic sectional view of the bottom flap with an alternatively formed retaining device.

Furthermore, for example as shown in FIG. 4, several retaining elements 29 can also be arranged one behind the other. They can be identical to one another or can vary; in particular, they can be differently sized and/or shaped. Furthermore, in accordance with FIG. 4, the retaining device 28 may also feature a retaining structure 31. The retaining structure 31 is, for example, a fluting, a granulation and/or a corrugation, which is arranged on the bottom surface 19. The retaining structure 31 may be incorporated in the bottom surface 19. For example, the bottom surface 19 can be roughened by means of corresponding processing. Alternatively, however, an additional means, which increases the friction compared to the untreated bottom surface 19, can also be applied. Accordingly, the retaining device 28, formed as a retaining structure 31, increases the adhesion between the bottom flap 11 and the fiber components 32.

The retaining structure 31 can also be formed by a multiple number of retaining elements 29 arranged one behind the other. Accordingly, the retaining device 28, in particular the retaining element 29 and/or the retaining structure 31, serves to, upon the opening of the associated bottom flap 11, be able to retain a part of the fiber components 32 by means of a form closure and/or frictional closure up to a partial opening angle β.

This is illustrated, for example, in FIGS. 3a, 3b, 3c. Accordingly, in the closed position of the bottom flap 11 shown in FIG. 3a, fiber components 32 are prevented from reaching the mixing belt arranged below the pan scale 1 in cooperation with the second bottom flap 10 (not shown in the present case).

FIG. 3b shows the bottom flap 11 in an intermediate position, in which it is rotated by a partial opening angle β. In this state, a first partial quantity 33 of the fiber components 32 in the transverse direction of the mixing belt 34 is poured into a first mixing belt area 35. At the same time, a second partial quantity 36 of the fiber components 32 is retained inside the container by means of the retaining device 28.

In FIG. 3c, the bottom flap 11 is rotated into its open position. Thus, the bottom flap 11 is rotated by its maximum opening angle α. In this state, the retaining device 28 can no longer retain the second partial quantity 36 of the fiber components 32, such that the second partial quantity 36 is emptied downwards onto the mixing belt 34. Given the fact that the bottom flap 11 is further rotated compared to the state presented in FIG. 3b, the second partial quantity 36 of the fiber components 32 is unloaded in a second mixing belt area 37 offset relative to the first mixing belt area 35. Advantageously, the dispensing area onto the mixing belt 34 in the transverse direction thereof can thus be influenced by the retaining device 28. As a result, a more homogeneous distribution of the fiber components 32 can be effected in the transverse direction of the mixing belt 34.

In practice, the dispensing of the fiber components 32 described in the form of discrete steps proceeds continuously and into one another. Furthermore, it is advantageous if the speed is controlled upon the opening of the bottom flap. For example, the control unit may be formed in such a manner that the rotational speed of the bottom flap 11 is controlled as a function of the opening angle α, β. Thus, it is advantageous if the rotational speed upon the opening of the bottom flap 11 is, at a first angular interval, for example up to the partial opening angle β shown in FIG. 3b, smaller or greater than at a second angular interval, for example a connected second angular interval. The control unit of the rotational speed as a function of the opening angle may be passively realized, for example, by a mechanical, pneumatic and/or hydraulic control mechanism. For example, a gearing and/or a linkage between the bottom flap 11 and the actuator 14 can be formed that, as a function of the opening angle, brings about different rotational speeds. In addition or alternatively, however, it is likewise conceivable for the pan scale 1 to comprise an electronic control unit, by means of which the speed of the actuator 14 can be influenced in order to achieve the above-stated effect.

As already stated above, FIG. 4 shows an alternative embodiment of the bottom flap 11 with different retaining devices 28. Thus, the illustrated bottom flap 11 features a retaining structure 31 in the area of the bottom surface 19. The retaining structure 31 is formed in particular as a fluting, a granulation and/or a corrugation. In addition, the bottom flap 11 features two protruding retaining elements 29a, 29b. In accordance with the present embodiment, such elements are arranged on the side surface 27. Both the retaining elements 29a, 29b and the retaining structure 31 can be arranged in the area of the bottom surface 19 and/or the side surface 27.

As already stated above, the pan scale 1 in accordance with the preceding description includes a control mechanism 38 for closing and opening the single bottom flap 11 of the one-piece bottom 9 or the two bottom flaps 10, 11 of the two-piece bottom 9. Furthermore, the pan scale 1 includes the electronic control unit 39 for controlling the control mechanism (see FIG. 1). The control mechanism 38 is formed and/or the control unit 39 is programmed in such a manner that a rotational speed and/or a rotational acceleration of the single bottom flap 11 or at least one of the two bottom flaps 10, 11 of the two-piece bottom 9 can be controlled as a function of the opening angle. In addition or alternatively, the control mechanism 38 is configured and/or the control unit 39 is programmed in such a manner that the opening angle of the single bottom flap 11 or at least one of the two bottom flaps 10, 11 of the two-piece bottom 9 can be controlled as a function of time. Advantageously, the quantity of ejection of the fiber components in the cross-section of the mixing belt can thereby be influenced in a partial area of the mixing belt 34. Thus, a more homogeneous distribution of the fiber components in the transverse direction of the mixing belt 34 can be advantageously achieved. As a result, a complete emptying of the pan scale 1 can be ensured since material cones are avoided. Furthermore, disruptions in material transport are avoided. Furthermore, this makes it possible to provide a highly cost-effective pan scale 1, by means of which excellent distribution can be achieved.

The control unit 39 is programmed in such a manner that the rotational speed and/or the rotational acceleration upon the opening of the at least one bottom flap 10, 11 is held constant, increased and/or reduced at least at an angular interval. It is also advantageous if the rotational speed and/or the rotational acceleration upon the opening of the at least one bottom flap 10, 11 is, at a first angular interval, smaller or greater than at a second angular interval. It is advantageous if the control mechanism 38 and/or the control unit 39 are formed in such a manner that the opening angle can be adjusted and/or controlled steplessly or in discrete steps. Furthermore, it is advantageous if the control unit 39 is programmed in such a manner that the at least one bottom flap 10, 11 is opened up to a first angular position, and is held in this first angular position within a first time window, and/or is subsequently opened up to a second angle position and/or is held in this second angular position within a second time window. It is also advantageous if the control mechanism 38 comprises at least the actuator 14, in particular a discrete or steplessly adjustable actuator, and/or if the two bottom flaps 10, 11 feature a common actuator 14 or a separately controllable actuator 14.

The invention is not limited to the illustrated and described embodiments. Variations within the framework of the claims, such as a combination of features, are also possible, even if such are presented and described in different embodiments.

LIST OF REFERENCE SIGNS

1 Pan scale
2 Container
3 Upper opening
4 First side wall on the longitudinal side
5 Second side wall on the longitudinal side
6 First front-end side wall
7 Second front-end side wall
8 Container frame
9 Bottom
10 First bottom flap
11 Second bottom flap
12 First linking point
13 Second linking point
14 Actuator
15 Longitudinal center plane
16 First force application point
17 Second force application point
18 First bottom surface
19 Second bottom surface
20 Separating plane
21 First pouring edge
22 Second pouring edge
23 First partial area
24 Second partial area
25 Bend
26 First side surface
27 Second side surface
28 Retaining device
29 Retaining element
30 Retaining surface
31 Retaining structure
32 Fiber components
33 First partial quantity of the fiber components
34 Mixing belt
35 First mixing band area
36 Second partial quantity of the fiber components
37 Second mixing band area
38 Control mechanism
39 Control unit
α Maximum opening angle
β Partial opening angle
V Offset
A Maximum opening width of the first bottom flap
B Maximum opening width of the second bottom flap

The invention claimed is:

1. A pan scale for weighing and ejecting fiber components onto a mixing belt, comprising:
an upwardly open container comprising a plurality of side walls and a bottom, wherein the bottom is formed by one of:
a single piece comprising a rotatably hinged bottom flap rotatable from a closing position abutting on one of the side walls into an open position folded away from such side wall, or
two pieces comprising rotatably hinged bottom flaps that are rotatable away from one another from an inner closing position abutting against one another into an outer open position;
the single bottom flap or at least one of the two bottom flaps further comprising a retaining device on at least one area of a bottom surface thereof; and
wherein, upon opening of the respective bottom flap, a part of the fiber components are retained in the container by the retaining device up to a partial opening angle ($\beta$) of the bottom flap.

2. The pan scale according claim 1, wherein the retaining device is spaced a pouring edge of the respective bottom flap.

3. The pan scale according to claim 1, wherein the retaining device comprises a retaining structure formed on the bottom surface of the respective bottom flap that provides a higher coefficient of friction to the fiber components as compared to an area of the bottom surface free of retaining devices.

4. The pan scale according to claim 1, wherein the retaining device comprises an elevated or recessed retaining element that extends across an entire length of the respective bottom flap.

5. The pan scale according to claim 1, wherein the retaining device is formed in one piece with the respective bottom flap or is connected to the respective bottom flap.

6. The pan scale according to claim 1, wherein the single bottom flap or at least one of the two bottom flaps is at least partially formed as a bent sheet metal part having a constant wall thickness, or is assembled from several individual parts, in such a manner that the retaining device is formed on the bottom surface of the respective bottom flap.

7. The pan scale according to claim 4, wherein the retaining element comprises a planar, concave, or convex retaining surface.

8. The pan scale according to claim 1, wherein the retaining element is on one of the two bottom flaps and extends into an area of the other bottom flap.

9. The pan scale according to claim 1, wherein a plurality of the retaining devices are arranged one behind the other on one of the two bottom flaps in an outward direction from a pouring edge of the respective bottom flap.

10. The pan scale according to claim 1, wherein the bottom of the container is divided into two parts in the longitudinal direction of the container and formed by the two rotatably hinged bottom flaps that are rotatable away from one another from an inner closing position abutting against one another into an outer open position, and wherein the two bottom flaps are formed asymmetrical to one another and have bottom surfaces of different sizes.

11. The pan scale according to claim 10, wherein the two bottom surfaces have a same length in the longitudinal direction of the container and a different width in a transverse direction of the container.

12. The pan scale according to claim 10, wherein the two bottom flaps abut one another in the closed position along a separating plane that is translationally offset relative to a longitudinal center plane of the container.

13. The pan scale according to claim 12, wherein linking points of the two bottom flaps are arranged symmetrically with respect to the longitudinal center plane and the two bottom flaps are pivotal by a same maximum opening angle.

14. The pan scale according to claim 12, wherein the two bottom flaps define a maximum opening width between a pouring edge of the bottom flap and the separating plane, wherein the maximum opening widths vary in size relative to one another.

15. The pan scale according to claim 1, further comprising a control mechanism for closing and opening the single bottom flap or the two bottom flaps, and an electronic control unit for controlling the control mechanism in such a manner that a rotational speed or rotational acceleration of the single bottom flap or at least one of the two bottom flaps is controlled as a function of the opening angle or as a function of time.

16. The pan scale according to claim 15, wherein the control unit is programmed such that the rotational speed or the rotational acceleration upon the opening of the bottom flap is held constant, increased, or reduced at least at an angular interval.

17. The pan scale according to claim 16, wherein the rotational speed or the rotational acceleration upon the opening of the bottom flap is, at a first angular interval, smaller than or greater than at a second angular interval.

18. The pan scale according to claim 15, wherein the control mechanism operates such that the opening angle is adjusted steplessly or in discrete steps.

19. The pan scale according to claim 15, wherein the control unit is programmed such that the bottom flap is opened up to a first angular position and is held in the first angular position within a first time window, and is subsequently opened up to a second angular position and is held in this second angular position within a second time window.

20. The pan scale according to claim 15, wherein the control mechanism comprises at least one actuator.

21. A mixing device for fiber components, comprising:
a mixing belt;
at least one pan scale arranged above the mixing belt; and
wherein the pan scale is in accordance with claim 1.

22. The mixing device according to claim 21, comprising at least two of the pan scales arranged one behind the other in the longitudinal direction of the mixing belt, wherein the pan scales are twisted by 180° relative to one another around a vertical axis of the mixing belt and are arranged in a manner offset to a transverse axis of the mixing belt.

* * * * *